United States Patent [19]

Carbonaro et al.

[11] Patent Number: 4,696,984

[45] Date of Patent: * Sep. 29, 1987

[54] ISOPRENE POLYMERIZATION PROCESS

[75] Inventors: Antonio Carbonaro, Milan; Domenico Ferraro, San Donato Milanese, both of Italy

[73] Assignee: Enichem Elastomeri, S.p.A., Palmero, Italy

[*] Notice: The portion of the term of this patent subsequent to Jun. 25, 2002 has been disclaimed.

[21] Appl. No.: 866,147

[22] Filed: May 22, 1986

[30] Foreign Application Priority Data

Jun. 5, 1985 [IT] Italy ................ 21037 A/85

[51] Int. Cl.$^4$ .............................. C08F 4/52
[52] U.S. Cl. .................... 526/98; 526/110; 526/137; 526/142; 526/143
[58] Field of Search ............ 526/98, 100, 137, 142, 526/143

[56] References Cited

U.S. PATENT DOCUMENTS

| | | | |
|---|---|---|---|
| 3,803,053 | 4/1974 | Yoo | 502/102 |
| 4,242,232 | 12/1980 | Sylvester | 526/137 |
| 4,461,883 | 7/1984 | Takeuchi | 526/142 |
| 4,525,549 | 6/1985 | Carbonaro | 526/137 |

*Primary Examiner*—Paul R. Michl
*Attorney, Agent, or Firm*—Hedman, Gibson, Costigan & Hoare

[57] ABSTRACT

Isoprene polymers and copolymers are prepared by a polymerization process carried out in the absence of solvents and in the presence of a catalytic system comprising (a) at least one element or compound of an element pertaining to Group IIIB of the Periodic Table, (b) at least one aluminium alkyl derivative, (c) at least one organic halogen derivative or at least one halide of an element able to exist in at least two valency states with the halide corresponding to a higher state than the minimum, or at least one halogen or at least one hydrogen halide acid, (d) at least one compound containing one or more hydroxyl groups of which the hydrogen can be substituted, the ratio of component (b) to component (a) being equal to or less than 20.

5 Claims, No Drawings

ISOPRENE POLYMERIZATION PROCESS

This invention relates to a process for preparing isoprene polymers and copolymers in the absence or substantial absence of diluents, by the use of a catalytic system comprising (a) at least one element or compound of an element pertaining to Group IIIB of the Periodic Table, (b) at least one aluminium alkyl derivative, (c) at least one organic halogen derivative or at least one halide of an element able to exist in at least two valency states, the halide corresponding to a higher state than the minimum, and (d) at least one compound containing one or more hydroxyl groups of which the hydrogen can be substituted, the ratio of component (b) to component (a) being equal to or less than 20.

Catalysts obtained from elements pertaining to Group IIIB of the Periodic Table are known to be active in polymerising conjugated diolefins.

For example, the use of compounds of the lanthanum series with mono or divalent bidentate organic ligands is described in U.S. Pat. Nos. 3,297,667 and 3,794,604, and lanthanum complexed with monovalent monodentate ligands is described in German Pat. Nos. 2,830,080 and 2,848,964.

Not all the indicated compounds are stable or easily obtainable. Their preparation often involves numerous reactions and laborious processing.

The said German patents, by associating the mentioned compounds with other compounds of organic nature such as aluminium alkyls, also completely avoid the presence of reagents such as oxygen, water, alcohols or carboxylic acids, which are all compounds normally used for deactivating the catalyst.

The applicant is the propietor of rights to use certain Italian patent applications, all relating to conjugated diolefin polymerisation and copolymerisation processes, some of which describe processes using catalytic systems which, surprisingly, contradict the teachings deducible from the aforesaid state of the art.

In particular U.S. Pat. No. 4,525,549 granted on June 25, 1986 and U.S. Pat. No. 4,436,884 granted on Mar. 13, 1984, describe processes for polymerising and copolymerising conjugated diolefins into linear products with a substantially entirely 1,4 cis structure, these processes involves contact between the respective monomers and multicomponent catalytic systems containing (a) at least one element or derivative of elements of Group IIIB, (b) at least one organic aluminium derivative, (c) at least one organic halogen derivative and, in coontradiction to the said known art, (d) at least one compound containing one or more salifiable hydroxyl groups.

Thus, the water, the alcohols or the carboxylic acids excercise a considerable cocatalytic action.

These polymerisation processes can be implemented either in the presence of a suitable reaction medium, or in the complete absence of diluents. In both cases the reaction proceeds in a controlled manner if in forming the catalyst care is taken to maintain defined ratios between the various constituents. Thus the ratio of component (c) to component (a) is greater than 0.1, the ratio of component (d) to component (a) is greater than 1, and the ratio of component (b) to component (a) is greater than 20, and preferably between 30 and 200.

This catalytic system leads to considerable advantages in butadiene polymerisation. For example, by suitably choosing the transition metal and the ratio of this (or its derivative) to the aluminium compound as heretofore indicated, a polybutadiene is obtained with a content of 1,4 cis units which is equal to or greater than 98%, a perfectly linear structure and a melting point among the highest ever observed.

Although in the case of butadiene there is no considerable difference in passing from polymerisation in solution to polymerisation without diluents, if isoprene is polymerised without diluents in accordance with the teachings of the two aforesaid patent appplications, although satisfactory results are obtained a polymer of high molecular weight cannot be prepared, which is a disadvantage considering the importance of a high molecular weight polyisoprene in order to avoid the drawbacks relating to the molecular weight reduction which occurs when this polymer is subjected to the usual mechanical working.

The applicant has now discovered the subject matter of the present invention, namely that it is possible to prepare products of applicational interest, ie polyisoprene of high cis content ($>96\%$), high molecular weight (Mooney viscosity $>75$) and free from gel, by simple means and considerably reduced reaction times compared with those normally used in processes in solution. This is made possible by carrying out the isoprene polymerisation (or copolymerisation) in the absence of diluents using a catalytic system of the aforesaid definition in which the ratio of the aluminium compound to the element, or its derivative, of Group IIIB of the Periodic Table is low.

By using ratios of less than or equal to 20, high conversions ($\geq 60\%$) into polyisoprene have been obtained, with a Mooney viscosity greater than 75 and polymerisation times ranging from 10 to 40 minutes, against the 4 to 5 hours of the processes in solution in which, because of the dilution, the productivity is further reduced.

Finishing is attained by incorporating stopping and stabilisation agents, dissolved for example in isoprene, and the excess monomer is eliminated in normal desolventising extruders.

The present invention therefore provides a process for preparing isoprene polymers or copolymers, and particularly for preparing polyisoprene of high cis content, in which the respective monomer or monomers are brought into contact, in the absence or substantial absence of any diluent, with a catalytic system comprising:

(a) at least one of those elements of Group IIIB of the Periodic Table having an atomic number of between 57 and 71, or at least one compound of such elements;

(b) at least one aluminium compound of formula $AlR_2R'$, in which R is alkyl, cycloalkyl or alkylaryl, and R' is R or hydrogen;

(c) at least one compound chosen from organic halogen derivatives, halides of elements able to exist in at least two valency states with the halide corresponding to a higher state than the minimum, halogens and hydrogen halide acids;

(d) at least one compound containing one or more salifiable hydroxyl groups such as water, alcohols and carboxylic acids, wherein the ratio of component (b) to component (a) is equal to or less than 20.

The components under (a) can be elements in the metal state. In this case they must be in a very reactive form and it is therefore advantageous to finely divide them by vaporisation under vacuum, at a residual pressure of between $10^{-1}$ and $10^{-6}$ Torr, and condensing them at low temperature (from −20° to −200° C.) on to a support formed from the component under (c) either in its pure state or diluted with a saturated or unsaturated aliphatic hydrocarbon. The reaction between (a) and (c) is then completed at ambient temperature or, depending on the nature of (c) by raising the suspension to a higher temperature (for example up to 100° C.) for a few minutes.

Preferred elements are neodymium, praseodymium, their mixtures and mixtures of these with lanthanum.

Derivatives of these elements can also be used. Those preferred are oxides, alcoholates and organic acid esters.

The component (c) can be of organic or inorganic nature.

Particularly suitable organic halogen derivatives are allyl chloride and bromide, crotyl chloride and bromide, methallyl chloride and bromide, benzyl chloride and bromide, benzoyl chloride and bromide, t-butyl chloride and bromide, methyl trichloride and tribromoacetate, butyl dichloroacetate, ethyl monochloroacetate, etc.

Halogens of elements able to exist in more than one valency state include tin tetrachloride, antimony-pentachloride, and chlorides and bromides of phosphorus, phosphoryl, sulphuryl etc.

With the ratio of component (b) to component (a) maintained equal to or less than 20, the catalytic system contains the various components in the following ratios:
(c)/(a) greater than 0.1 and preferably between 1 and 3;
(d)/(a) greater than 1 and preferably between 3 and 10.
Of the compounds under (d), particular mention should be made of the use of water which, although poorly soluble in aliphatic hydrocarbons, is fairly soluble in diolefins in the liquid state.

The polymerisation temperature can be chosen within a very wide range, for example between 0° and 130° C. It does not substantially influence the polymer characteristics, except for the reaction kinetics, the average molecular weight, the molecular weight distribution and the cis content. For these reasons the preferred range is between 40° and 80° C.

As stated, the process according to the present invention enables not only isoprene of high 1,4 cis content to be obtained but also copolyomers of isoprene with a second conjugated diolefin. Again in this latter case, the copolymers are characterised by a microstructure which is essentially entirely of 1,4 cis type.

The polymerisation reaction according to the present invention can be implemented in conventional homogeneous agitated reactors if the conversion is to be limited to a moderate level of for example 50–60%. If a higher conversion level is required, then because of the presence of very viscous polymer masses it is preferable to use elongated polymerisation reactors in which the mixture can slide under a piston movement. Thus extruders in which the mass under polymerisation is pushed along by selfcleaning single screw or double screw agitators are suitable for the purpose.

Other characteristics of the products obtained together with some operating details will be apparent from reading the following examples, which are given merely for illustrating the invention but without limiting its range in any way.

EXAMPLE 1

Catalyst preparation

A teflon-coated metal anchor is placed in a strong-walled glass bottle of about 100 ml capacity, after which the following are introduced in the stated order:
$Nd_2O_3$ (commercial product, 95%): 4.04 g
naphthenic acids (acid value 200): 19.8 g
paraffin oil (vaseline oil): 45 ml.

The bottle is stoppered with a perforated crown cap and a neoprene gasket, and placed in a water bath temperature-controlled at 80° C. The metal anchor is driven with a vorticose movement by a rotating magnet.

After 5 minutes, 0.08 ml of an aqueous 37% HCl solution are added to the reaction mixture by means of a microsyringe with a hypodermic needle.

After about 20 minutes the solution colour changes from grey to brown, with simultaneous formation of $H_2O$. After a total of two hours of reaction at 80° C. a viscous solution is obtained which, on cooling to ambient temperature, is slowly transferred under agitation to a glass flask containing 471 ml of a 0.97 molar solution of $(iC_4H_9)_2AlH$ (DIBAH) in paraffin oil preserved under an atmosphere of dry nitrogen.

After one hour, 8.5 ml of tert-butyl chloride are added dropwise to the same flask followed immediately by 5 ml of isoprene.

The catalytic solution obtained in this manner is left at ambient temperature for 24 hours prior to use, after which it is preserved under the same conditions. Elementary analysis shows the following molarities:
Nd: 0.0426 g.atoms/l
Al: 0.849 g.atoms/l
Cl: 0.126 g.atoms/l

Isoprene polymerisation

A cylindrical stainless steel autoclave disposed vertically and provided with a magnetically driven mechanical agitator, an upper condenser cooled to 0° C., and a jacket for electrical heating or cooling with water flowing along its wall, is put under vacuum by means of a mechanical pump, after which 500 g (735 ml ca. abs. atm.) of isoprene are drawn in.

The autoclave is temperature controlled at 70° C. (temperature of the agitated internal liquid) before feeding into it, by nitrogen pressure, 10.4 ml of the described catalytic solution in paraffin oil.

The heat of reaction is dissipated partly by internal cooling deriving from the boiling and reflux, and partly by heat transfer through the wall. The temperature of the polymerisation mass is kept between 70° and 75° C. Ten minutes after its commencement, the reaction is interrupted by rapid distillation of the unreacted monomer, which is collected in a cold bottle connected to the autoclave.

The polymer obtained is shredded and immersed in denatured ethyl alcohol containing 1% of dissolved AO 2246 for some hours, and is then dried under vacuum.

345 g (74,2% conversion) of a dry product are obtained with a 1,4 cis unit content, determined by $^{13}C$-NMR spectography, of 97.1%, and a Mooney viscosity (1+4, 100° C.) of 89.

EXAMPLE 2

The polymerisation described in Example 1 is repeated but with the following variations:
temperature 50° C. (instead of 70° C.)

13.5 ml of catalytic solution used (instead of 15.3).

The reaction under agitation was extended to 22 minutes, during which the temperature fluctuated between 50° and 58° C. 322 g (64.4% conversion) of dry polymer were obtained having a cis content of 97.8% and a Mooney viscosity of 85.

EXAMPLE 3

Catalyst preparation

The initial part of the preparation relating to the reaction at 80° C. between $Nd_2O_3$ and naphthenic acids is carried out as described in Example 1.

The viscous solution is reacted under the indicated conditions with 373 ml of the 0.97 molar solution of DIBAH in oil and, after one hour, with 8.5 ml of tert-butyl chloride.

The catalyst prepared in this manner is left at ambient temperature for 24 hours prior to use. Elementary analysis shows the following concentrations:

Nd: 0.052 g.atoms/l
Al: 0.823 g.atoms/l
Cl: 0.157 g.atoms/l

Isoprene polymerisation

A glass reactor of capacity 1 l is provided with a variable speed mechanical agitator and a steel top with a fitted valve, and into it are fed firstly the isoprene (300 g) and then, after heating to 70° C. in a temperature-controlled bath, 5.77 ml of the aforesaid catalytic solution.

The reaction is extended to 28 minutes, during which the temperature, measured internally by a thermocouple, fluctuates between 70° and 80° C.

The test is interrupted by discharging the product into 200 ml of ethyl alcohol containing 1% of antioxidant AO 2246.

The polymer is dried under vacuum at 30° C., to obtain 212 g of dry product (70.6% conversion).

This cis content is 97.7% and the Mooney viscosity 76.

EXAMPLE 4

Operating in a manner analogous to that described in Example 3, isoprene is polymerised with a smaller quantity of catalyst, namely 4.8 ml instead of 5.7 ml.

The reaction proceeds at 70°–71° C. for 40 minutes before interruption with alcohol. 182 g of dry polymer are obtained having a Mooney viscosity of 85.

We claim:

1. A bulk polymerization process for preparing isoprene polymers and copolymers having a high cis content, high molecular weight and substantially no gel, wherein the respective monomer or monomers are brought into contact with a catalytic system comprising:
   (a) at least one element of Group IIIB of the Periodic Table having an atomic number of between 57 and 71 or at least one compound thereof;
   (b) at least one aluminum compound of the formula $AlR_2R'$, wherein R is alkyl, cycloalkyl or alkylaryl, and R' is R or hydrogen;
   (c) at least one compound selected from organic halogen derivatives, halides of elements able to exist in at least two valence states with the halide corresponding to a higher valence state than the minimum, halogens and hydrogen halide acids;
   (d) at least one compound containing at least one salifiable hydroxyl group, said process comprising carrying out the reaction in the absence of diluents and at a ratio of component (b) to component (a) equal to or less than 20.

2. The process of claim 1 wherein component (a) is selected from the group consisting of neodymium, praseodymium, mixtures thereof either alone or in combination with lanthanum, and compounds thereof.

3. The process of claim 2 wherein component (a) is at least one oxide of neodymium or praseodymium.

4. The process of claim 1 wherein the reaction is carried out at a temperature of between 0° and 130° C.

5. The process of claim 4 wherein the reaction is carried out at a temperature of between 40° 'and 80° C.

* * * * *